United States Patent Office 2,916,125
Patented Dec. 8, 1959

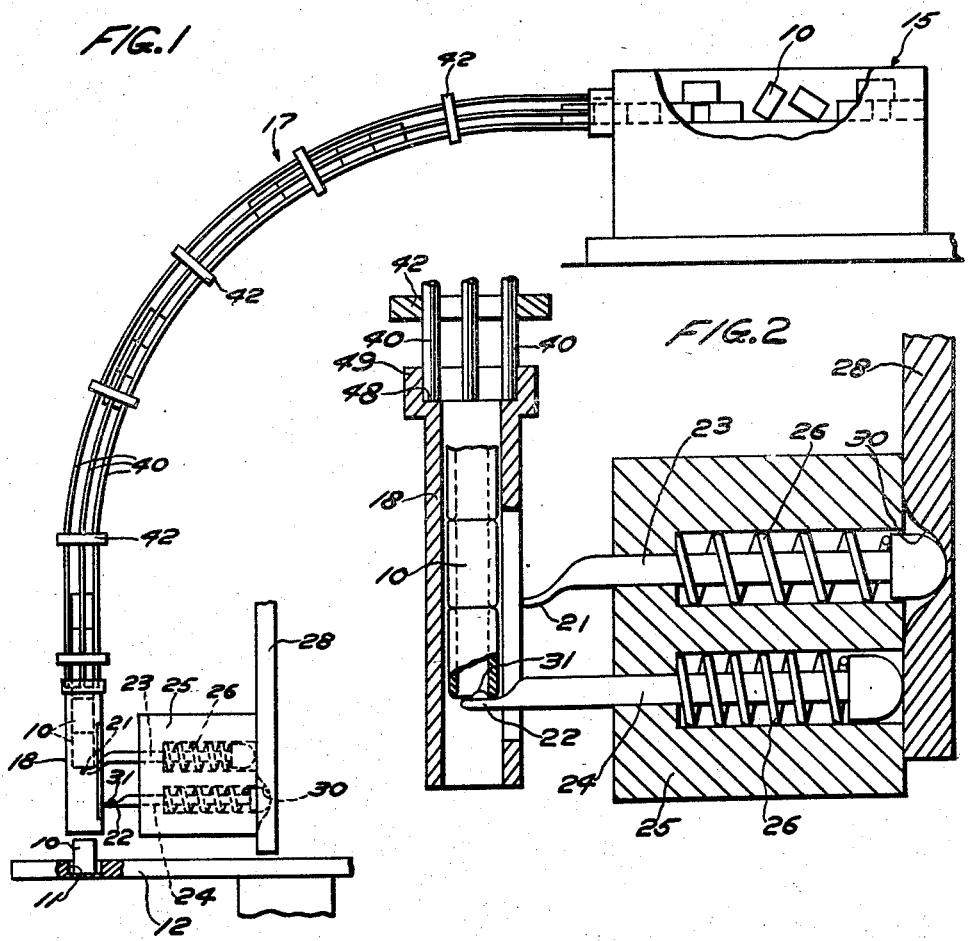

2,916,125

ARTICLE FEEDING DEVICE AND GUIDING MECHANISM

Marshall Wallberg, Indianapolis, Ind., assignor to Western Electric Company, Incorporated, New York, N.Y., a corporation of New York Application January 30, 1956, Serial No. 562,295

3 Claims. (Cl. 193—40)

This invention relates to article feeding mechanisms, and more particularly to flexible chutes for guiding articles through predetermined paths.

An object of the present invention is to provide an improved device for feeding articles.

Another object of the invention is to provide an improved chute for guiding articles through predetermined paths.

Another object of the invention is to provide a flexible article guiding device which may be readily fabricated and flexed to different shapes for guiding the articles through a predetermined path.

A device illustrating certain features of the invention may include a flexible wire chute for receiving a row of articles from an article orienting and feeding device and for guiding the row of articles for movement through a predetermined curved path into a vertical tube and into engagement with a pair of stop members which are alternately reciprocated to release the articles one at a time. The wires of the chute are supported at longitudinally spaced intervals by rings which have internal notches for holding the wires in predetermined laterally spaced relation to each other with portions of the wires disposed in the ring opening to form continuous article supporting and guiding surfaces, and the rings may be moved on the wires and the wires and the chute flexed into different positions to guide the articles through a predetermined path.

Other objects and advantages of the invention will become apparent by reference to the following detailed description and the accompanying drawings illustrating a preferred embodiment thereof, in which Fig. 1 is a simplified fragmentary front view of a mechanism for feeding and guiding articles;

Fig. 2 is an enlarged fragmentary sectional view through a portion of the article feeding and guiding mechanism;

Fig. 3 is an enlarged fragmentary side elevational view of the chute for guiding the articles;

Fig. 4 is a sectional view through the chute taken on line 4—4 of Fig. 3 and showing one embodiment of a wire supporting member; and Fig. 5 is a view similar to Fig. 4 showing a modified form of wire supporting member.

The present device is designed to orient and feed hollow cylindrical articles 10, such as, for example, protector block springs, successively in upright position into seats 11 of a feed table 12 for subsequent further processing. A batch of cylindrical articles 10 is placed in a hopper of a feeding device 15 which hopper has article supporting tracks and is oscillated for orienting the articles in a row in axial alignment with each other and advancing them in a horizontal direction through an opening in the feeding device 15 into a chute 17. The chute 17 receives the row of horizontally moving articles 10 and guides them through a curved path into the upper end of the vertically disposed stationary feed tube 18 wherein the row of articles is supported alternately on a pair of stop members 21 and 22, which are alternately reciprocated into and out of engagement with the lowermost article and the next adjacent article to release successive articles.

The stop members 21 and 22 are formed on the end of rods 23 and 24 which are mounted for horizontal reciprocation in a block 25 and are stressed by springs 26 for movement away from the feed tube into engagement with a vertically reciprocable actuating bar 28. The bar 28 has a cam surface 30 and is reciprocated in timed relation to the indexing of the feed table 12 to effect the release of successive lowermost articles 10 in response to successive reciprocation of the actuating bar 28. The stop member 22 which intermittently supports the row of articles 10, has a round cam lobe 31 thereon which is moved past the lower edge of lowermost hollow article 10 for raising and lowering the row of articles 10 to aid in maintaining free feeding movement of the articles in the chute 17 and the feed tube 18.

The chute 17 comprises a plurality of flexible wires or rods 40 which are supported in a circle in predetermined laterally spaced relation to each other by spacing and supporting members 42 to form a substantially hollow cylindrical guideway for the articles 10. The wire supporting members 42 are spaced apart predetermined distances longitudinally of the wires and are in the form of rings, each of which may be solid as shown in Fig. 4 or may have a slot 43 therein as shown in Fig. 5. The rings 42 may be punched from heavy sheet metal or otherwise formed and they have recesses or notches 44 formed along the inner portion thereof in communication with the central opening 45 of the ring for supporting the wires with a portion of the wires extending into the central opening 45 to form continuous inwardly directed article engaging surfaces 46 for supporting and guiding the articles throughout the length of the chute. The notches 44 are cylindrical to conform to the wires 40 and to engage more than half of the circumference thereof and frictionally hold them while permitting relative movement between the wires and the rings 42 longitudinally of the wires. In the fabrication of the chute 17 the wires 40 may be threaded into the notches 44 of the supporting members 42 and the supporting members 42 moved longitudinally of the wires to predetermined spaced positions thereon.

In the rings 42 shown in Fig. 5 the wire retaining notches 44 have relatively wide necks which permit the wires 40 to be moved into the central opening 46 and snapped past the neck portions into the notches. Thus, in fabricating the chute from the wires 40 and rings 42 having slots 43 therein the wires 40 are moved through the slots 43 of the rings into the central opening 45 thereof and then snapped into the wire retaining notches 44. With the rings 42 movable longitudinally on the wires 40, the wires 40 and the chute 17 may be flexed into different shapes as desired to guide the articles 10 through predetermined paths of travel.

One end of the chute 17 is secured to the oscillatory hopper of the article feeding device 15 to vibrate the chute and the articles therein and cooperate with the cam 31 on the stop member 22 to obtain the free movement of the articles. The lower end of the chute is inserted in the upper enlarged end of the feed tube 18 (Fig. 2) and the wires 40 thereof rest on a shoulder 48 and engage a collar portion 49 of the feed tube which aligns the chute 17 coaxially with the feed tube. After the chute 17 has been assembled and connected in position to the feed tube 18 and the article feeding device 15, the portions of the rings 42 adjacent the wire holding recesses 44 may be swaged as at 50 (Fig. 5) by a hand tool to press portions of the rings against the wires to firmly secure the wires 40 to the members 42.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A chute for guiding articles which comprises a plurality of wires, a plurality of supporting members spaced apart longitudinally along the wires, each of the supporting members having a central opening and a plurality of recesses extending from said opening for engaging more than half of the circumference of the wires to support and retain the wires in a predetermined laterally spaced relation to each other with portions of the wires disposed within the central opening of the supporting members and forming continuous article supporting and guiding surfaces and means for retaining the row of articles in said guiding surfaces and successively releasing the lowermost articles, said retaining means having a cam thereon to raise and lower the articles.

2. A chute for guiding articles which comprises a plurality of wires, and a plurality of rings disposed at intervals along the wires, each of said rings having a central opening and a slot for movement of the wires laterally therethrough into the central opening and each of said rings having a plurality of notches with restricted neck portions communicating with said central opening for allowing the wires to be forced through the neck portions into the notches and be held thereby in a predetermined laterally spaced relation to each other with portions of the wires disposed within the central opening of the rings to form continuous article supporting and guiding surfaces.

3. A flexible chute for guiding articles which comprises a plurality of flexible rods, and a plurality of supporting members spaced longitudinally on said rods, each of said supporting members having a central opening and a plurality of notches engageable with a major circumferential portion of the rods and provided with reduced neck portions communicating with the central opening for allowing the rods to be forced through the neck portions into the notches and be supported thereby for longitudinal movement relative to the supporting members and in a predetermined laterally spaced relation to each other with portions of the rods disposed within the central opening of the supporting members and forming continuous article supporting and guiding surfaces, whereby said rods and the chute may be flexed into a predetermined shape to guide the articles through a predetermined path.

References Cited in the file of this patent

UNITED STATES PATENTS

| Number | Name | Date |
|---|---|---|
| 190,559 | Curtis | May 8, 1877 |
| 676,761 | Morris | June 18, 1901 |
| 864,639 | Gier | Aug. 27, 1907 |
| 1,484,241 | Tompkins | Feb. 19, 1924 |
| 1,626,242 | Lanza | Apr. 26, 1927 |
| 1,630,345 | Lanza | May 31, 1927 |
| 1,971,221 | Hunker et al. | Aug. 21, 1934 |
| 2,427,712 | Casler | Sept. 23, 1947 |
| 2,561,377 | Jones | July 24, 1951 |
| 2,609,914 | Balsiger | Sept. 9, 1952 |
| 2,696,285 | Zenlea | Dec. 7, 1954 |
| 2,720,302 | Madden | Oct. 11, 1955 |
| 2,744,601 | Chilton | May 8, 1956 |

FOREIGN PATENTS

| Number | Country | Date |
|---|---|---|
| 208,578 | Germany | Mar. 31, 1909 |

OTHER REFERENCES

American Machinist (Goodbar), Oct. 2, 1950, pgs. 114, 115.